United States Patent
Hasegawa et al.

(10) Patent No.: US 12,248,167 B2
(45) Date of Patent: Mar. 11, 2025

(54) ILLUMINATION DEVICE

(71) Applicant: Japan Display Inc., Tokyo (JP)

(72) Inventors: Makoto Hasegawa, Tokyo (JP); Nobuyuki Suzuki, Tokyo (JP); Masafumi Okada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/631,044

(22) Filed: Apr. 10, 2024

(65) Prior Publication Data

US 2024/0255691 A1  Aug. 1, 2024

Related U.S. Application Data

(63) Continuation of application No. PCT/JP2022/036700, filed on Sep. 30, 2022.

(30) Foreign Application Priority Data

Oct. 11, 2021 (JP) .................................. 2021-166817

(51) Int. Cl.
*F21V 8/00* (2006.01)

(52) U.S. Cl.
CPC ......... *G02B 6/0076* (2013.01); *G02B 6/0025* (2013.01); *G02B 6/0053* (2013.01); *G02B 6/0068* (2013.01)

(58) Field of Classification Search
CPC ... G02B 6/0036; G02B 6/0038; G02B 6/0076
See application file for complete search history.

(56) References Cited

U.S. PATENT DOCUMENTS

| | | | |
|---|---|---|---|
| 2012/0105765 A1 | 5/2012 | Kawai et al. | |
| 2012/0242930 A1* | 9/2012 | Ryu | G02B 6/0076 362/607 |
| 2014/0098563 A1 | 4/2014 | Kim et al. | |
| 2015/0301384 A1 | 10/2015 | Koike et al. | |

FOREIGN PATENT DOCUMENTS

| | | |
|---|---|---|
| JP | 2010-223334 A | 10/2010 |
| JP | 2012-099291 A | 5/2012 |
| JP | 2013-190779 A | 9/2013 |
| JP | 2014-075334 A | 4/2014 |

OTHER PUBLICATIONS

International Search Report and Written Opinion mailed on Nov. 15, 2022, received for PCT Application PCT/JP2022/036700, filed on Sep. 30, 2022, 9 pages including English Translation.
Global Dossier English-language translation of JP Office Action mailed on Jul. 23, 2024 in a corresponding JP Application No. 2023-555117, 4pp.

* cited by examiner

*Primary Examiner* — Robert J May
(74) *Attorney, Agent, or Firm* — XSENSUS LLP (57) ABSTRACT

According to one embodiment, in an illumination device, a second light guide includes a plurality of fourth projecting portions provided in a first area of a fifth main surface opposing a prism sheet, a plurality of fifth projecting portions provided in a second area of a fifth main surface, and a plurality of sixth projecting portions on a sixth main surface opposing the fifth main surface, cross-sectional shapes of the fourth projecting portions and the fifth projecting portions are scalene triangles, and the fourth projecting portions and the fifth projecting portions are arranged in respective positions line-symmetrical position with respect to each other in plan view.

5 Claims, 6 Drawing Sheets

ILLUMINATION DEVICE

CROSS-REFERENCE TO RELATED APPLICATIONS

This application is a Continuation application of PCT Application No. PCT/JP2022/036700, filed Sep. 30, 2022 and based upon and claiming the benefit of priority from Japanese Patent Application No. 2021-166817, filed Oct. 11, 2021, the entire contents of all of which are incorporated herein by reference.

FIELD

Embodiments described herein relate generally to an illumination device.

BACKGROUND

An illumination device comprising a light source element on an end surface of a light guide has been developed. In particular, an illumination device which can control the direction of emission of light has been developed.

DETAILED DESCRIPTION

In general, according to one embodiment, an illumination device comprises a first illumination element comprising a first light guide, a plurality of first light source elements provided on a first side surface of the first light guide, and a plurality of second light source elements provided on a second side surface on an opposite side to the first side surface;

a second illumination element comprising a second light guide, a plurality of third light source elements provided on a third side surface of the second light guide, and a plurality of fourth light source elements provided on a fourth side surface on an opposite side to the third side surface; and a prism sheet provided between the first illumination elements and the second illumination elements, wherein the first light guide includes a plurality of first projecting portions on a first main surface and a plurality of second projecting portions on a second main surface on an opposite side to the first main surface, the prism sheet includes a plurality of third projecting portions on a third main surface opposing the first light guide and a fourth main surface opposing the second light guide, the second light guide includes a plurality of fourth projecting portions provided in a first area of a fifth main surface opposing the prism sheet, a plurality of fifth projecting portions provided in a second area of the fifth main surface, and a plurality of sixth projecting portions on a sixth main surface opposing the fifth main surface, cross-sectional shapes of the fourth projecting portions and the fifth projecting portions are scalene triangles, and the fourth projecting portions and the fifth projecting portions are arranged in respective positions line-symmetrical position with respect to each other in plan view.

An object of this embodiment is to provide an illumination device which can irradiates light at a desired location.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of an illumination device with reference to the drawings.

In this embodiment, a first direction X, a second direction Y and a third direction Z are orthogonal to each other, but may intersect at an angle other than 90°. The direction toward the tip of the arrow in the third direction Z is defined as up or above, and the direction opposite to the direction toward the tip of the arrow in the third direction Z is defined as down or below.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the illumination device on a tip side of the arrow in the third direction Z. Here, viewing from this observation position toward the X-Y plane defined by the first direction X and the second direction Y is referred to as plan view. Viewing a cross-section of the illumination device in the X-Z plane defined by the first direction X and the third direction Z or in the Y-Z plane defined by the second direction Y and the third direction Z is referred to as cross-sectional view.

Embodiment

Figure 1:
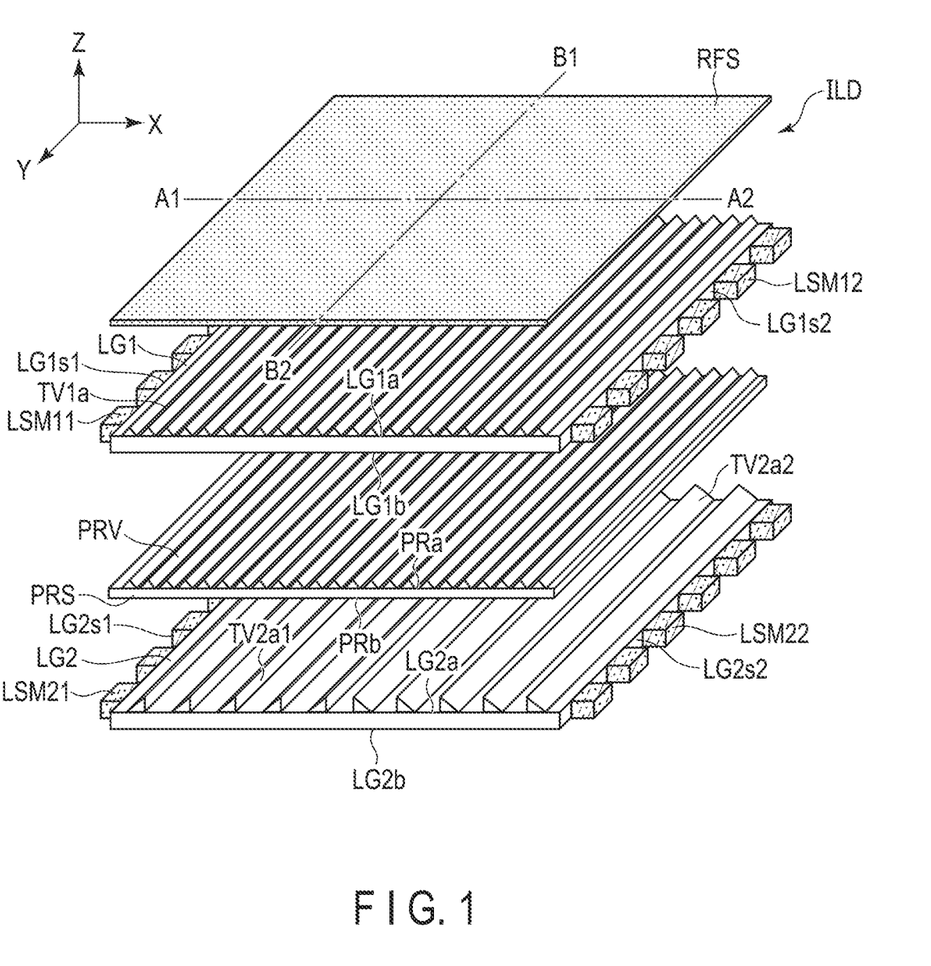
FIG. 1 is an exploded perspective view schematically showing a configuration of an illumination device of an embodiment.
Figure 2:
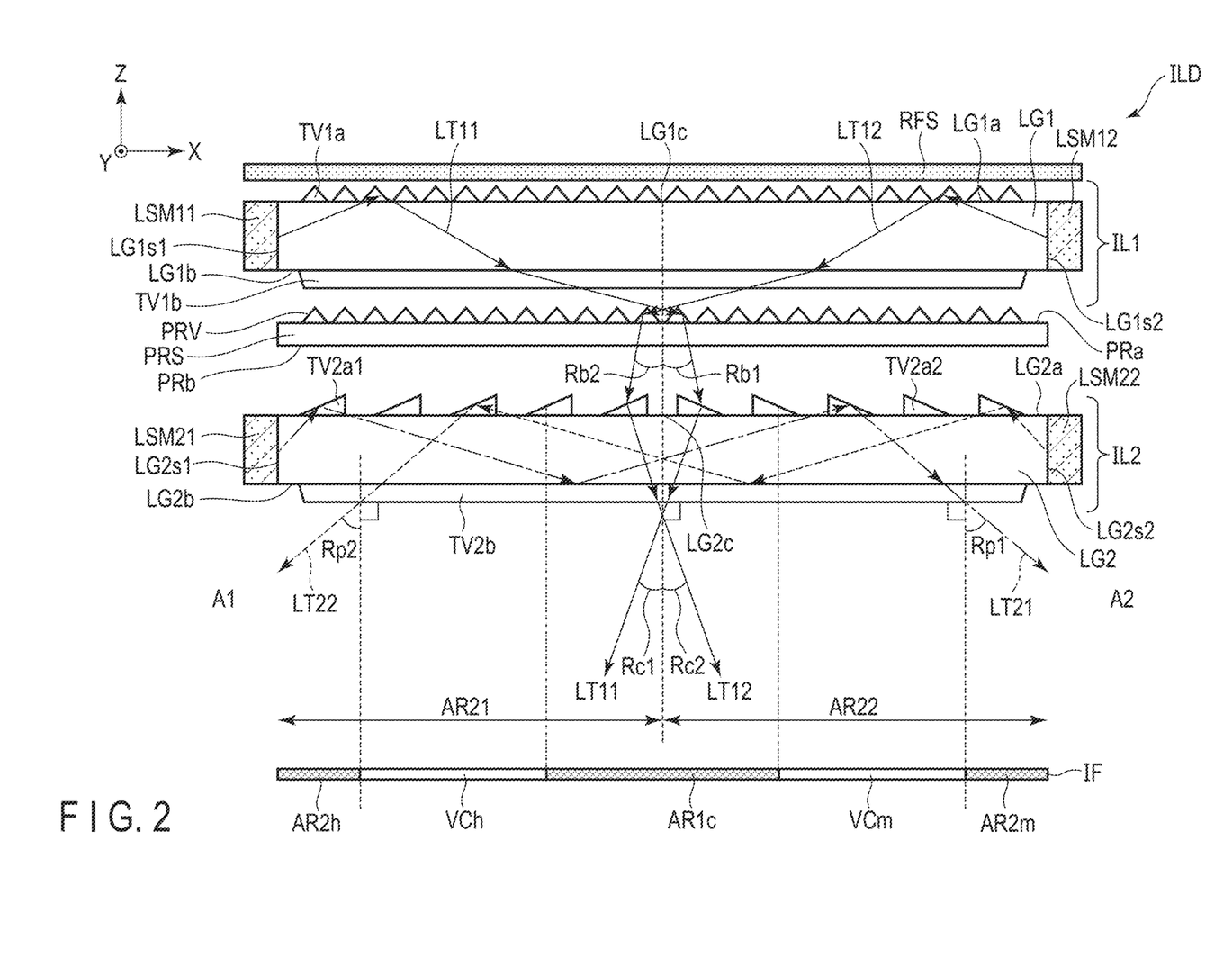
FIG. 2 is a cross-sectional view schematically showing the illumination device taken along line A1-A2 in FIG. 1.

FIG. 1 is an exploded view showing a schematic configuration of an illumination device of this embodiment. FIG. 2 is a cross-sectional view schematically showing the illumination device taken along line A1-A2 in FIG. 1.

An illumination device ILD comprises a reflective sheet RFS, an illumination element IL1, a prism sheet PRS, and an illumination element IL2, which are stacked one on another along a direction opposite to the third direction Z. Light emitted from the illumination device ILD is emitted downward.

The illumination element IL1 comprises a light guide LG1 and a plurality of light source elements LSM11 and light source elements LSM12. The plurality of light source elements LSM11 are provided adjacent to a side surface LG1$s$1 of the light guide LG1. The plurality of light source elements LSM12 are provided adjacent to a side surface LG1$s$2 of the light guide LG1. The side surface LG1$s$1 and the side surface LG1$s$2 are each a light entry portion where light from the respective one of the light source elements LSM11 and the light source elements LSM12 enters. On an edge of the light guide LG1, parallel to the first direction X, a central portion thereof is denoted by LG1$c$.

The light guide LG1 comprises a main surface LG1$a$ opposing the reflective sheet RFS and a main surface LG1$b$ opposing the prism sheet PRS. The main surface LG1$b$ is provided on a side opposite to the main surface LG1$a$ so as to oppose thereto. The light guide LG1 is provided with a plurality of projecting portions TV1$a$ on the main surface LG1$a$ and a plurality of projecting portions TV1$b$ on the main surface LG1$b$.

The plurality of projecting portions TV1$a$ are arranged along a direction parallel to the first direction X and each extends along a direction parallel to the second direction Y. The plurality of projecting portions TV1$b$ each extend in a direction parallel to the first direction X and are arranged along a direction parallel to the second direction Y. Each of the projecting portions TV1$a$ and the projecting portions TV1$b$ has a triangular prism form, the cross-sectional shape of which is a scalene triangle. The cross-sectional shape may as well be an equilateral triangle.

The prism sheet PRS comprises a main surface PR$a$ opposing the light guide LG1 and a main surface PR$a$ opposing the light guide LG2. The main surface PR$a$ is provided on an opposite side to the main surface PR$b$ so as to oppose thereto. In FIGS. 1 and 2, a plurality of projecting portions PRV are provided on the entire main surface PR$a$. Although not shown in the figure, a plurality of projecting portions PRVs may as well be provided in front of the main surface PR$b$.

The plurality of projecting portions PRV are arranged along a direction parallel to the first direction X and each extends along a direction parallel to the second direction Y. Each of the projecting portions PRV has a triangular prism form, the cross-sectional shape of which is a triangle. The cross-sectional shape should preferably be an isosceles triangle, and further may as well be an equilateral triangle.

The illumination element IL2 comprises a light guide LG2, a plurality of light source elements LSM21 and a plurality of light source elements LSM22. The plurality of light source elements LSM21 are provided adjacent to one side surface LG2$s$1 of the light guide LG2. The plurality of light source elements LSM22 are provided adjacent to another side surface LG2$s$2 on an opposite side to the surface LG2$s$1. The side surface LG2$s$1 and the side surface LG2$s$2 are each a light entry portion where light from the light source elements LSM21 and the light source elements LSM22 enter, respectively. On an edge of the light guide LG2, parallel to the first direction X, a central portion thereof is denoted by LG2$c$.

The light guide LG2 comprises a main surface LG2$a$ opposing the prism sheet PRS and a main surface LG2$b$ provided on an opposite side to the main surface LG2$a$ so as to oppose thereto. The light guide LG2 is provided with a plurality of projecting portions TV2$a$1 and projecting portions TV2$a$2 on the main surface LG2$a$ and a plurality of projecting portions TV2$b$ on the main surface LG2$b$.

In the area of the main surface LG2$a$, from an end portion proximate to the side surface LG2$s$1 to the central portion LG2$c$ is designated as an area AR21 and that from an end portion proximate to the side surface LG2$s$2 to the central portion LG2$c$ is designated as an area AR22. The plurality of projecting portions TV2$a$1 are provided in the area AR21, and the plurality of projecting portions TV2$b$2 are provided in the area AR22.

The plurality of projecting portions TV2$a$1 and projecting portions TV2$a$2 are arranged in a direction parallel to the first direction X and each extends along a direction parallel to the second direction Y. Each of the plurality of projecting portions TV2$a$1 and projecting portions TV2$a$2 has a triangular prism form.

Each of the plurality of projecting portions TV2$a$1 has a cross-sectional shape in the X-Y plane of a scalene triangle. The scalene triangle a triangle in which all sides are unequal in length from each other.

Each of the plurality of projecting portions TV2$a$2 has a cross-sectional shape in the X-Y plane of a scalene triangle. Details of the cross-sectional shapes of the projecting portions TV2$a$1 and the projecting portions TV2$a$2 will be provided later.

The plurality of projecting portions TV2$b$ each extends along a direction parallel to the first direction X and are arranged in a direction parallel to the second direction Y. Each of the plurality of projecting portions TV2$b$ has a triangular prism form, a cross-sectional shape of which is an isosceles triangle. Note that the cross-sectional shape may as well be an equilateral triangle.

Figure 3:
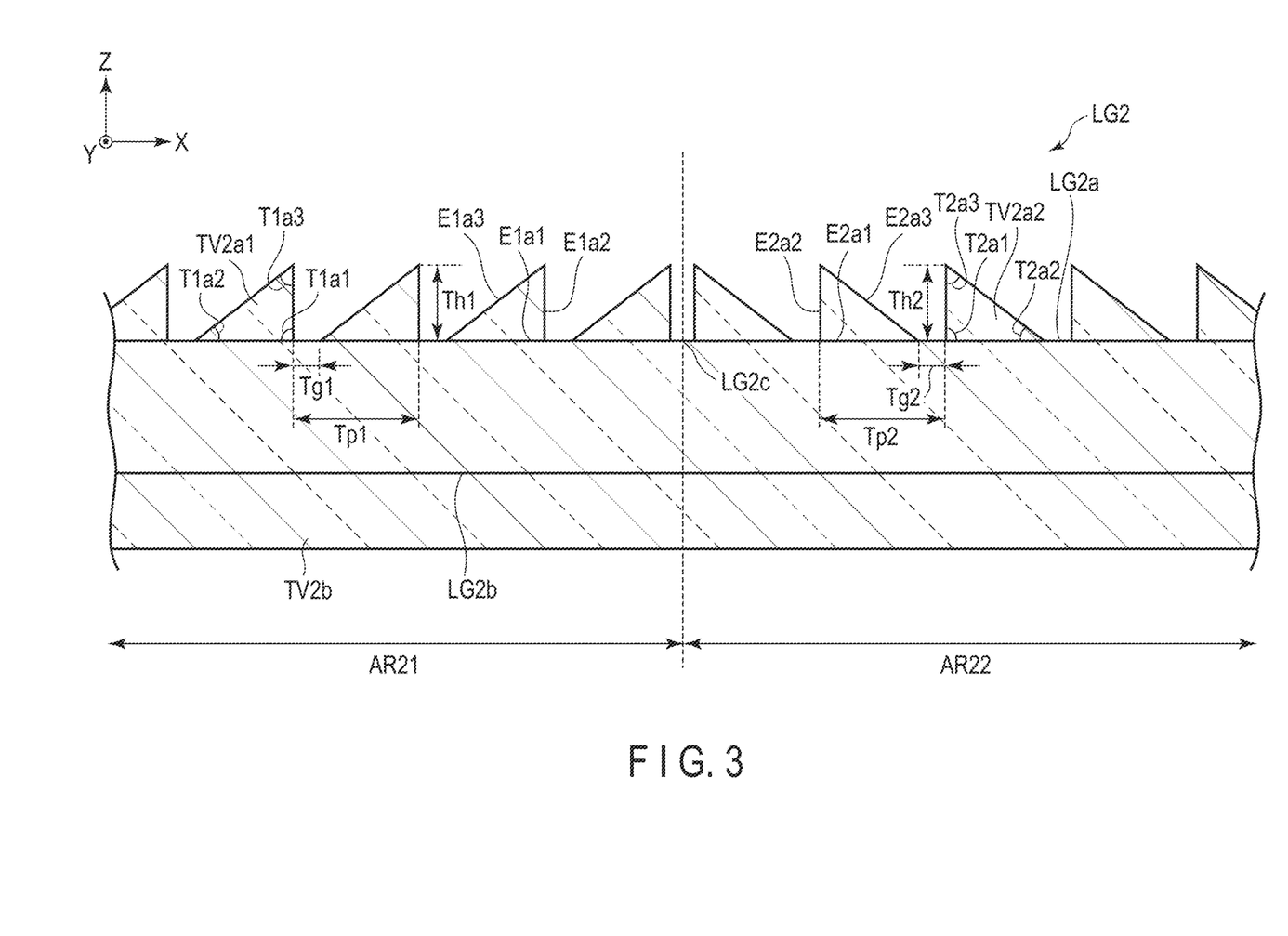
FIG. 3 is an enlarged cross-sectional view schematically showing a shape of projecting portions of the illumination device.

FIG. 3 is a schematic enlarged cross-sectional view showing the shape of the projecting portions of the illumination device. In each of the projecting portions TV2$a$1 and the projecting portions TV2$a$2 of the light guide LG2, the cross-sectional shape in the X-Z plane is a scalene triangle.

Among the edges of the cross-sectional shape of the projecting portions TV2$a$1, the edge tangent to the main surface LG2$a$ of the light guide LG2 is designated as an edge E1$a$1. The projecting portions TV2$a$1 each include an edge E1$a$2 and an edge E1$a$3 extending from the edge E1$a$1. The angle formed by the edge E1$a$1 and the edge E1$a$2 is designated as an angle T1$a$1, the angle formed by the edge E1$a$1 and the edge E1$a$3 is designated as an angle T1$a$2, and the angle formed by the edge E1$a$2 and the edge E1$a$3 is designated as an angle T1$a$3.

The lengths of the edges E1$a$1, E1$a$2, and E1$a$3 are all different from each other.

The angle T1$a$1 should preferably be 90°. That is, the cross-sectional shape of the projecting portions TV2$a$1 should preferably be a right triangle. When the angle T1$a$1 is 90°, light incident on the projecting portions TV1$a$ can be efficiently reflected, which is desirable. Note here that the configuration is not limited to this, and it suffices if the angle T1$a$1 is close to 90°, for example, in a range between 80° and 90°.

The angle T1a2 is an acute angle, for example, 15°. The angle T1a3 is an acute angle, for example, 75°. The angles T1a2 and T1a3 can be determined according to the light distribution angle of the emitted light.

The gap and pitch of each adjacent pair of the plurality of projecting portions TV2a1 are defined as a pitch Tg1 and a pitch Tp1, respectively. The pitch Tp1 is the sum of the length of the edge E1a1 and the gap Tg1. Here, by setting the angle T1a1, the angle T1a2, the angle T1a3 and the pitch Tp1 set to predetermined values and changing the length of the edge E1a1 and the height Th1 of the projecting portion TV2a1, the distribution of the emitted light can be controlled.

Among the edges of the cross-sectional shape of the projecting portions TV2a2, the edge tangent to the main surface LG2a of the light guide LG2 is designated as an edge E2a1. The cross-sectional shape of the projecting portions TV2a2, includes an edge E2b2 and an edge E2b3, which extend from the edge E2b1. The angle formed by the edge E2a1 and the edge E2a2 is designated as an angle T2a1, the angle formed by the edge E2a1 and the edge E2a3 is designated as an angle T2a2, and the angle formed by an edge E2a2 and an edge E2a3 is designated as an angle T2a3.

The lengths of the edge E2a1, the edge E2a2, and the edge E2a3 are all different from each other.

As in the case of the angle T2a1 of the projecting portions TV2a1, the angle T2a1 should preferably be 90°. In other words, the cross-sectional shape of the projecting portions TV2a1 should preferably be a right triangle. When the angle T2a1 is 90°, light incident on the projecting portion TV2a can be reflected efficiently, which is suitable. However, the configuration is not limited to this, but it suffices if the angle T2a1 is close to 90°, for example, between in a range of 80° and 90°.

The angle T2a2 is an acute angle, for example, 15°. The angle T2a3 is an acute angle, for example, 75°. The angle T2a2 and the angle T2a3 should be determined appropriately according to the light distribution angle of the emitted light.

The gap and pitch between each adjacent pair of the projecting portions TV2a2 are defined as a gap Tg2 and a pitch Tp2, respectively. The pitch Tp2 is the sum of the length of the edge E2a1 and the gap Tg2. As in the case of the projecting portions TV2a1, by setting the angle T1a1, the angle T2a2, the angle T2a3 and the pitch Tp2 to predetermined values and changing the length of the edge E2a1 and the height Th2 of the projecting portions TV2a2, the distribution of the emitted light can be controlled.

The cross-sectional shape of each of the projecting portions TV2a1 and the cross-sectional shape of each of the projecting portions TV2a2 are arranged in line symmetrical positions with respect to a direction parallel to the Y-Z plane. In this embodiment, the lengths of the edges E1a1 and E2a1, the lengths of the edges E1a2 and E2a2, and the lengths of the edges E1a3 and E2a3 are equal to each other in each case.

The degrees of the angle T1a1 and the angle T2a1, those of the angle T1a2 and the angle T2a2, and those of the angle T1a3 and the angle T2a3 are equal to each other in each case.

The gap Tg1 and Tg2, and the pitch Tp1 and Tp2 are equal to each other.

Figure 4:
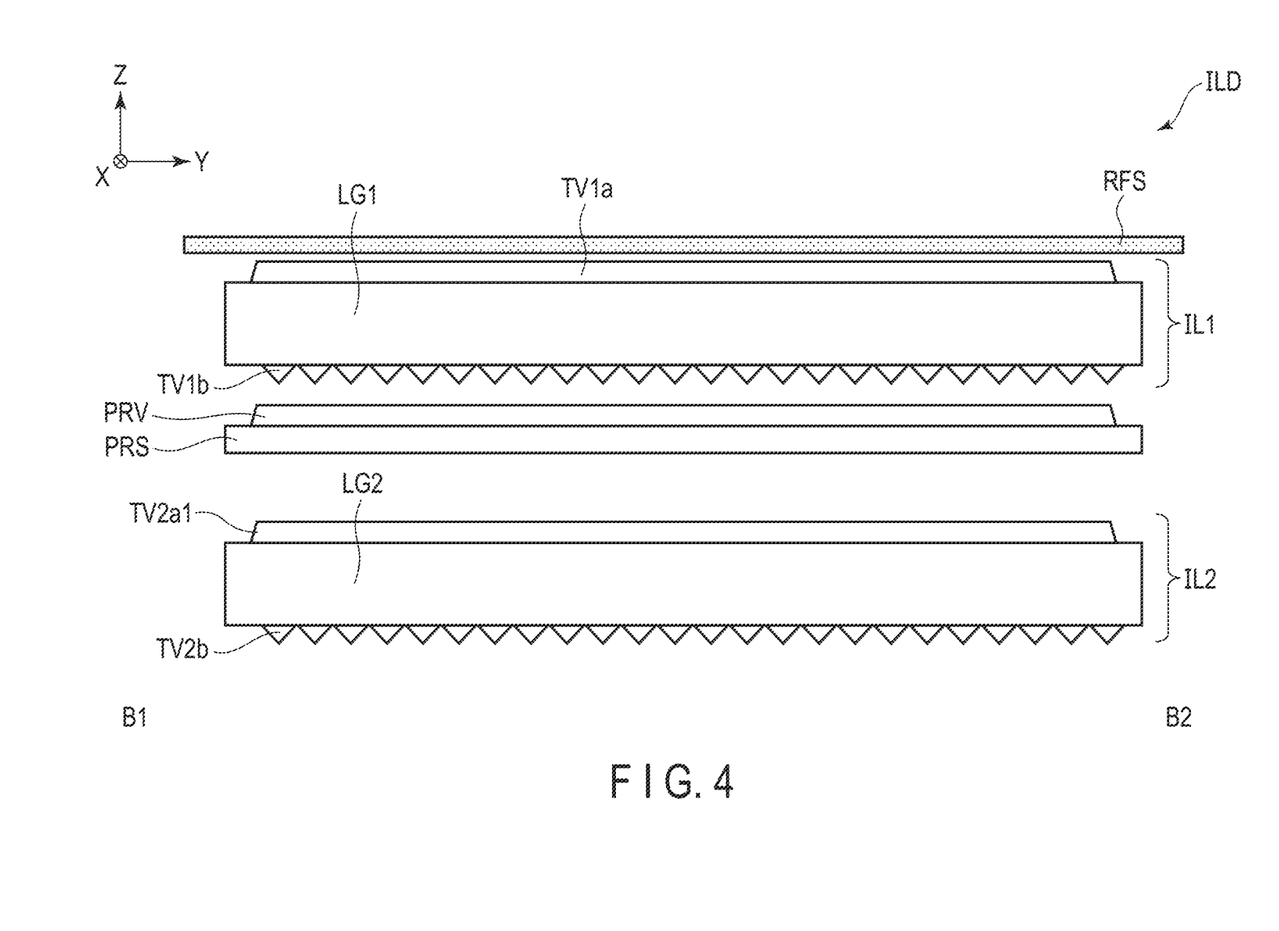
FIG. 4 is a cross-sectional view schematically showing the illumination device taken along line B1-B2 in FIG. 1.

FIG. 4 is a cross-sectional view of the illumination device taken along line B1-B2 in FIG. 1. The cross-sectional shape of each of the plurality of projecting portions TV1b of the light guide LG1 and the plurality of projecting portions TV2b of the light guide LG2 in the X-Z plane is an isosceles triangle. The cross-sectional shape may as well be an equilateral triangle.

The light distribution angle of the emitted light will be described with reference back to FIG. 2.

In the illumination element IL1, light LT1 emitted from the light source elements LSM11 enters the light guide LG1 from the side surface LG1s1. The light LT11 propagates along the first direction X in the light guide LG1 while totally reflecting therewithin. The light LT11 changes its reflection angle due to the projecting portions TV1a and is emitted toward the prism sheet PRS.

The light LT11 incident on the main surface PRa of the prism sheet PRS changes the reflection angle further due to the projecting portions PRV, and is emitted from the main surface PRb. The light LT11 thus emitted is made more parallel with respect to the third direction Z. In other words, the light is emitted in a direction more perpendicular to the main surface PRb. An angle of the light LT11 with respect to the third direction Z is referred to as Rb1, and here the angle Rb1 is, for example, 10°. The light LT11 emitted from the main surface PRb of the prism sheet PRS enters the illumination element IL2.

The light LT11 entering the illumination element IL2 passes through the light guide LG2 and is emitted downward. Here, an angle of the light LT11 emitted from the illumination element IL2 with respect to the third direction Z is referred to as Rc1.

The light LT12 emitted from the light source element LSM12 enters the light guide LG1 from the side surface LG1s2. The light LT12 propagates in the light guide LG1 along a direction opposite to the first direction X, while being totally reflected therewithin. The light LT12 changes its reflection angle due to the projecting portions TV1a and the projecting portions TV1b, and is emitted toward the prism sheet PRS.

As in the case of the light LT11, the light LT12 incident on the main surface PRa of the prism sheet PRS further changes its reflection angle by the projecting portions PRV and is emitted from the main surface PRb. Light LT1T thus emitted is made more parallel with respect to the third direction Z. In other words, the light is emitted in a direction more perpendicular to the main surface PRb. Here, when the angle of the light LT12 with respect to the third direction Z is designated as Rb2, the angle Rb2 is, for example, 10°. The light LT12 emitted from the main surface PRb of the prism sheet PRS enters the illumination element IL2. Here, the sum of the angle Rb1 and the angle Rb2 is designated as an angle Rb.

The light LT12 entering the illumination element IL2 passes through the light guide LG2 and is emitted downward. Here, an angle of the light LT12 emitted from the illumination element IL2 with respect to the third direction Z is designated as Rc2. When the sum of the angles Rc1 and Rc2 is referred to as an angle Rc, the angle Rc is the light distribution angle of the light emitted from the illumination element IL1.

The light LT11, light LT12, light LT21, and light LT22 are collimated light. In the ideal collimated light, the angle of the emitted light in the first direction X and second direction Y is 0°, but in the actual emitted light, there is a distribution of emission angles. The projecting portions TV1a, the projecting portions TV2a1, and the projecting portions TV2a2 contribute to the emission angle in the first direction X, while the projecting portions TV1b and the projecting portions TV2b contribute to the emission angle in the second direction Y.

Here, let us suppose an irradiation surface IF by the light emitted from the illumination device ILD in the X-Y plane. The area illuminated by the illumination light emitted from the illumination device ILD actually has a three-dimensional spread. However, for the sake of clarity of explanation, in FIG. 2, the irradiation surface IF spreading in the X-Y plane will be described.

In the irradiation surface IF, the area irradiated by the light LT11 and the light LT12 emitted is designated as an area AR1c. The area AR1c overlaps the central portion LG1c of the light guide LG1 and the central portion LG2c of the light guide LG2 in plan view.

In the illumination element IL2, light LT21 emitted from the light source element LSM21 enters the light guide LG2 from the side surface LG2s1. The light LT21 propagates along the first direction X in the light guide LG2 while being totally reflected therewithin. The light LT21 changes the reflection angle due to the projecting portions TV2a1, the projecting portions TV2a2, and the projecting portions TV2b, and is emitted obliquely with respect to the third direction Z.

The light LT22 emitted from the light source element LSM22 enters the light guide LG2 from the side surface LG2s2. The light LT22 propagates in the light guide LG2 along a direction opposite to the first direction X, while being totally reflected therewithin. The light LT22 changes its reflection angle due to the projecting portions TV2a1, the projecting portion TV2a2, and the projecting portion TV2b and is emitted obliquely with respect to the third direction Z.

The angles of the light LT21 and the light LT22 emitted with respect to the third direction Z are designated as an angle Rp1 and an angle Rp2, respectively. When the sum of the angle Rp1 and the angle Rp2 is referred to as an angle Rp, the angle Rp is the light distribution angle of the light emitted from illumination element IL2.

Here, the area illuminated by the light LT21 emitted from light guide LG2 in an oblique direction is designated as an area AR2m. Similarly, the area illuminated by the light LT22 is designated as an area AR2h.

The angle Rp is greater than the angle Rc. The angles Rp1 and Rp2 are each, for example, 45°, that is, the angle Rp is 90°. On the other hand, the angles Rc1 and Rc2 are each, for example, 15°, that is the angle Rc is 30°.

Note that the angles Rb1 and Rb2 are each, for example, 10° as described above. That is, the angle Rb is 20°. The light LT11 and the light LT12 increase their light distribution angles when passing through the illumination element IL2. For example, the light LT11 has an angle Rb1 of 10° when emitted from the illumination element IL1, but the angle Rc1 increases to 20° when emitted from the illumination element IL2. However, the difference between the angle Rc1 and the angle Rb1 is less than the difference between the angle Rc1 and the angle Rp1. The difference between the angle Rc2 and the angle Rb2 is less than the difference between the angle Rc2 and the angle Rp2. With this configuration, even if the light distribution angle of the light increases when passing through the illumination element IL2, its influence is considered to be less.

In the irradiated surface IF, there is a non-illuminated area VCh between the area AR1c and the area AR2h. Between the area AR1c and the area AR2m, there is a non-illuminated area VCm. Note that such a configuration is not limited to that of this embodiment, but the angle Rc and the angle Rp may be determined so as not to generate the area VCh and the area VCm.

FIGS. 5, 6, 7, and 8 each show an example of the application of the illumination device of this embodiment. A room RM includes a door DR, a desk DK, chairs CR1 and CR2, an object OBJ, and an illumination device ILD provided on a ceiling CIL. The object OBJ is located near the center of the room RM and can be, for example, a TV, a painting or the like.

Figure 5:
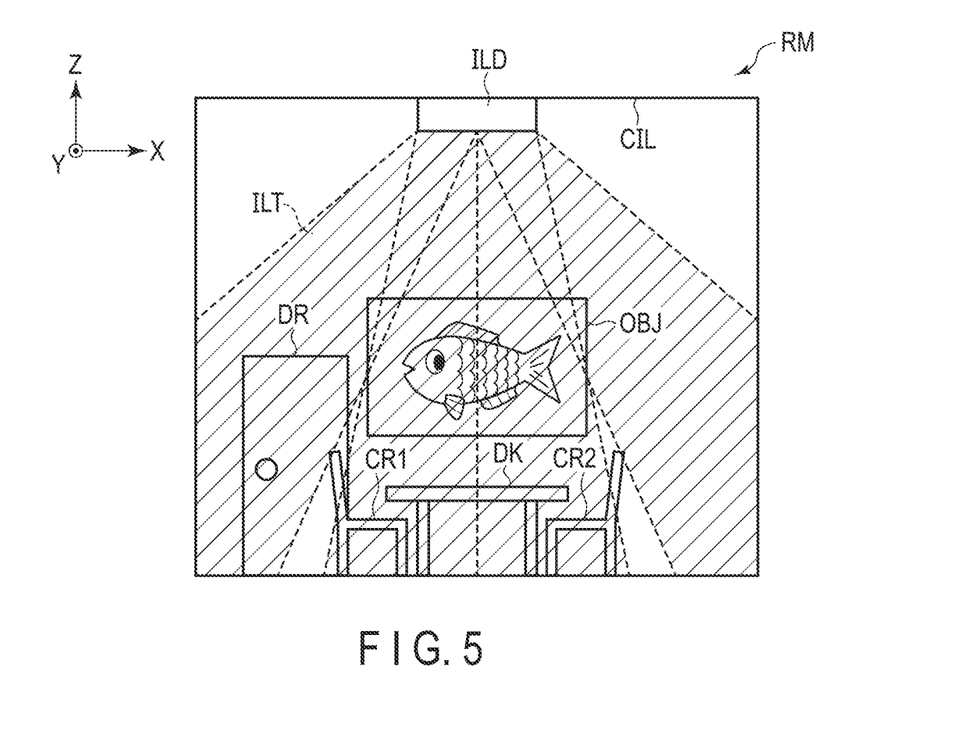
FIG. 5 is a diagram showing an example in which the illumination device of the embodiment is applied.

FIG. 5 shows an example in which both illumination elements IL1 and IL2 of the illumination device ILD are in an on state, that is, a light source element LSM11, a light source element LSM12, a light source element LSM21, and a light source element LSM22 are all turned on. Illumination light ILT is irradiated on both the left and right sides and on both the inner and outer sides of the page. The illumination light ILT corresponds to light LT11, light LT12, light LT21, and light LT22. This type of illumination can be used, for example, to brightly illuminate the entire room RM.

Figure 6:
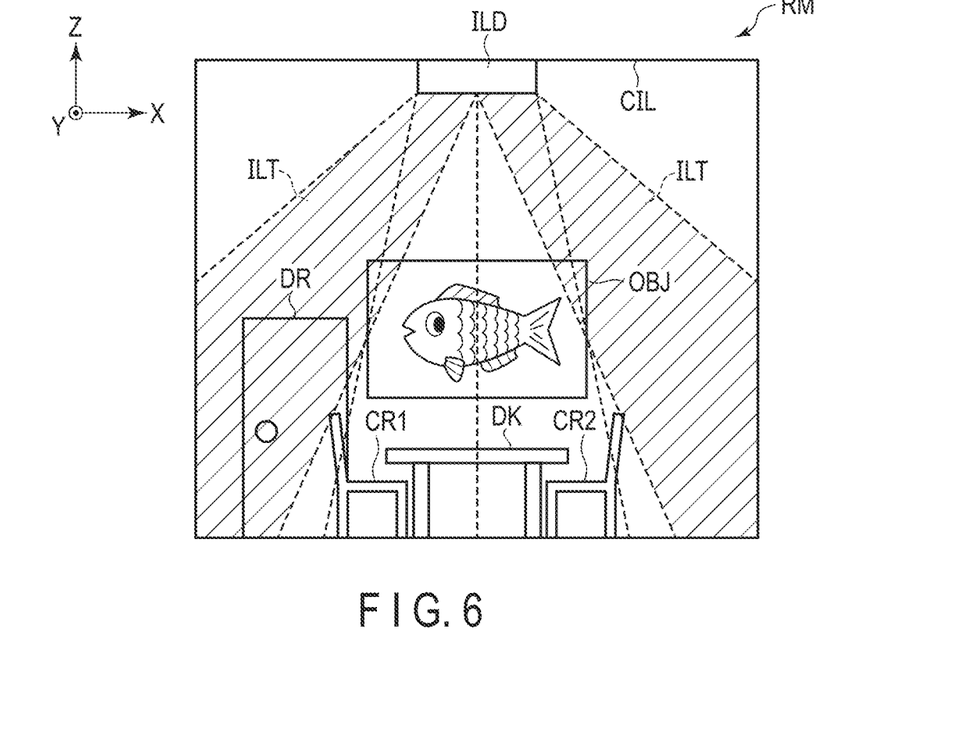
FIG. 6 is a diagram showing an example in which the illumination device of the embodiment is applied.

FIG. 6 shows an example in which only the illumination element IL2 of the illumination device ILD is in the on state, that is, the light source element LSM21 and the light source element LSM22 are turned on. The illuminating element IL1 is in an off state, that is, the light source element LSM11 and the light source element LSM12 are turned off. The illumination light ILT is spot light that is irradiated on both the left and right sides and only on the outer side of the page. The illumination light ILT corresponds to the light LT21 and the light LT22. This type of illumination can be used, for example, not to illuminate the center of the room RM, and not to make the room RM in a dark state.

Figure 7:
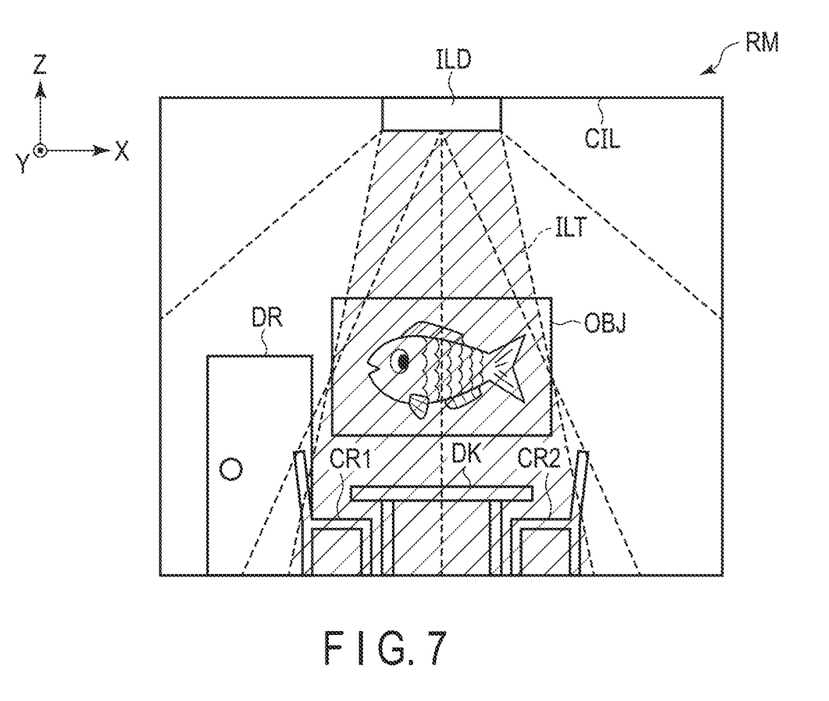
FIG. 7 is a diagram showing an example in which the illumination device of the embodiment is applied.

FIG. 7 shows an example in which only the illumination element IL1 of the illumination device ILD is in the on state, that is, the light source element LSM11 and the light source element LSM12 are turned on. The illuminating element IL2 is in the off state, that is, the light source element LSM21 and the light source element LSM22 are turned off. The illumination light ILT is spot light that is irradiated on both the left and right sides and only on the inner side of the page. The illumination light ILT corresponds to the light LT11 and the light LT12. For example, contrary to FIG. 6, this type of illumination can be used to illuminate the center of the room RM. More specifically, the desk DK and the object OBJ, placed near the center of the room RM, can be illuminated.

Figure 8:
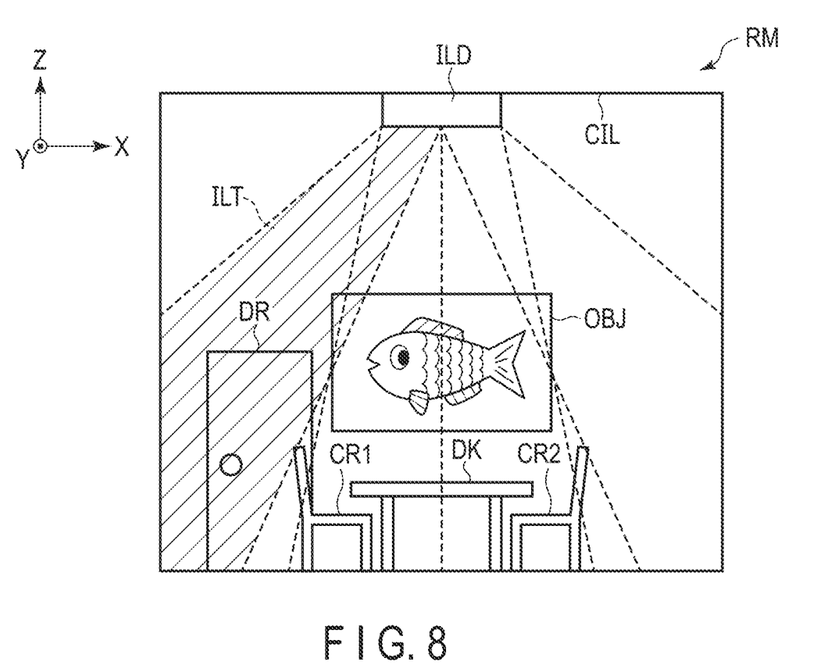
FIG. 8 is a diagram showing an example in which the illumination device of the embodiment is applied.

FIG. 8 shows an example in which only the light source element LSM22 of the illumination element IL2 of the illumination device ILD is turned on. The light source element LSM11 and the light source element LSM12 of the illumination element IL1 and the light source element LSM21 of the illumination element IL2 are turned off. The illumination light ILT is spot light that is irradiated only on the left side and the outer side of the page. The illumination light ILT corresponds to the light LT22. This type of illumination can be used, for example, to illuminate one side (left side of the page) of the room RM. More specifically, the door DR on one side of the room RM can be illuminated.

The illumination device of this embodiment can illuminate an area near the center of the irradiated surface by setting the illumination element IL1 in the on state. By setting the illumination element IL2 in the on state, the outer area of the irradiated surface can be illuminated. Further, by adjusting the on and off states of the light source elements provided at the left and right ends, either one or both of the left and right areas can be illuminated.

With the above-described embodiment, it is possible to provide an illumination device that can irradiate light onto a desired position.

In this disclosure, the light guide LG1 and the light guide LG2 may as well be referred to as first light guide and second light guide, respectively. The side surface LG1s1, the side surface LG1s2, the side surface LG2s1, and the side surface LG2s2 may as well be referred to as a first side surface, a second side surface, a third side surface, and a fourth side surface, respectively. The main surface LG1a, the main surface LG1b, the main surface PRa, the main surface PRb, the main surface LG2a, and the main surface LG2b may as well be referred to as a first main surface, a second main surface, a third main surface, a fourth main surface, a fifth main surface, and a sixth main surface, respectively. The area AR21 and the area AR22 of the light guide LG2 may as well be referred to as a first area and a second area, respectively.

The projecting portions TV1a, the projecting portions TV1b, the projecting portions PRV, the projecting portions TV2a1, the projecting portions TV2a2, and the projecting portions TV2b may as well be referred to as first projecting portions, second projecting portions, third projecting portions, fourth projecting portions, fifth projecting portions, and sixth projecting portions, respectively.

The edge E1a1, the edge E1a2, and the edge E1a3 of the scalene triangle, which is the cross-sectional shape of the projecting portions TV2a1 are referred to as a first edge, a second edge, and a third edge, respectively. The angle T1a1 formed by the edge E1a1 and the edge E1a2, the angle T1a2 formed by the edge E1a1 and the edge E1a3, and the angle T1a3 formed by the edge E1a2 and the edge E1a3 are referred to as a first angle, a second angle, and a third angle, respectively.

The edges E2a1, the edge E2a2, and the edge E2a3 of the scalene triangle, which is the cross-sectional shape of the projecting portions TV2a2 are a fourth edge, a fifth edge, and a sixth edge, respectively. The angle T2a1 formed by the edge E2a1 and the edge E2a2, the angle T2a2 formed by the edge E2a1 and the edge E2a3, and the angle T2a3 formed by the edge E2a2 and the edge E2a3 are referred to as a fourth angle, a fifth angle, and a sixth angle, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
    a first illumination element comprising a first light guide, a plurality of first light source elements provided on a first side surface of the first light guide, and a plurality of second light source elements provided on a second side surface on an opposite side to the first side surface;
    a second illumination element comprising a second light guide, a plurality of third light source elements provided on a third side surface of the second light guide, and a plurality of fourth light source elements provided on a fourth side surface on an opposite side to the third side surface; and
    a prism sheet provided between the first illumination elements and the second illumination elements, wherein
    the first light guide includes a plurality of first projecting portions on a first main surface and a plurality of second projecting portions on a second main surface on an opposite side to the first main surface,
    the prism sheet includes a plurality of third projecting portions on a third main surface opposing the first light guide and a fourth main surface opposing the second light guide,
    the second light guide includes a plurality of fourth projecting portions provided in a first area of a fifth main surface opposing the prism sheet, a plurality of fifth projecting portions provided in a second area of the fifth main surface, and a plurality of sixth projecting portions on a sixth main surface opposing the fifth main surface,
    cross-sectional shapes of the fourth projecting portions and the fifth projecting portions are scalene triangles, and
    the fourth projecting portions and the fifth projecting portions are arranged in respective positions line-symmetrical position with respect to each other in plan view.

2. The illumination device according to claim 1, wherein
    the scalene triangle, which is the cross-sectional shape of each of the fourth projecting portions, includes a first edge in contact with the fifth main surface, a second edge and a third edge extending from the first edge,
    an angle formed by the first edge and the second edge is a first angle, an angle formed by the first edge and the third edge is a second angle, and an angle formed by the second edge and the third edge is a third angle,
    the scalene triangle, which is the cross-sectional shape of each of the fifth projecting portions, includes a fourth edge in contact with the fifth main surface, and a fifth edge and a sixth edge, extending from the fourth edge,
    an angle formed by the fourth edge and the fifth edge is a fourth angle, an angle formed by the fourth edge and the sixth edge is a fifth angle, and an angle formed by the fifth edge and the sixth edge is a sixth angle, and
    the first angle and the fourth angle are each 90°.

3. The illumination device according to claim 2, wherein
lengths of the first edge, the second edge, and the third edge are different from each other, and
lengths of the fourth edge, the fifth edge, and the sixth edge are different from each other.

4. The illumination device according to claim 1, wherein
the plurality of first projecting portions, the plurality of second projecting portions, the plurality of third projecting portions, and the plurality of sixth projecting portions each have a cross-sectional shape of an isosceles triangle.

5. The illumination device according to claim 4, wherein
the plurality of first projecting portions, the plurality of second projecting portions, the plurality of third projecting portions, and the plurality of sixth projecting portions each have a cross-sectional shape of an equilateral triangle.

* * * * *